Patented Jan. 18, 1944

2,339,552

UNITED STATES PATENT OFFICE 2,339,552

VULCANIZATION ACCELERATOR

Edward L. Carr, Akron, Ohio, assignor to The Firestone Tire & Rubber Company, Akron, Ohio, a corporation of Ohio No Drawing. Application September 27, 1941,
Serial No. 412,685

15 Claims. (Cl. 260—788)

This invention relates to the vulcanization of rubber, and relates especially to a new class of chemical compounds which are valuable accelerators for the vulcanization of rubber or rubber-like substances. This application is a continuation in part of co-pending application Serial Number 259,712, filed March 3, 1939, now Patent Number 2,271,834.

It is a primary object of the present invention to provide a new class of accelerators for the vulcanization of natural or synthetic rubber.

Another object is to provide a class of improved rubber vulcanization accelerators of the delayed action, non-scorching type.

Another object is to provide a method of vulcanizing rubber whereby scorching or pre-vulcanization during processing of the rubber compound is prevented, but extremely rapid vulcanization is obtained at customary vulcanizing temperatures.

Another object is to provide improved rubber compositions possessing the ability to vulcanize extremely rapidly at ordinary vulcanizing temperatures, but free from any tendency to set-up or pre-vulcanize at rubber processing temperatures.

A further object is to provide vulcanized rubber of improved quality, possessing the characteristics of high modulus and tensile, low hysteresis and a high inherent resistance to deterioration by flexing or aging.

The above and further objects will be manifest in the description of the invention which follows.

It has been found that members of a new class of chemical compounds are very effective in accelerating the vulcanization of natural or synthetic rubber. The new compounds may be conveniently prepared by oxidizing a mixture of an aromatic 2-mercaptothiazole and an ammonia derivative of the formula RNH₂, wherein R represents hydrogen, an alkyl radical or an amino-substituted alkyl radical. The preparative oxidation reaction may be effected by treating a mixture of the mercaptothiazole and an excess of the ammonia derivative in an alkaline aqueous medium with one of the following oxidizing agents: chlorine, bromine, iodine, hypochlorous acid, hypobromous acid, hypoiodous acid, and alkali metal and alkaline earth metal salts of said acids. The oxidation reaction is thought to comprise the direct action of a hypohalous acid, or an alkali metal or an alkaline earth metal salt thereof, on a mixture of the mercaptothiazole and one equivalent of the ammonia derivative.

The desired substances produced by this oxidation reaction are organic compounds containing nitrogen and sulfur.

This new class of accelerators is believed to possess the following type formula:

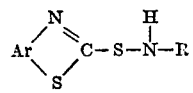

wherein Ar is an orthoarylene radical and R is hydrogen, an alkyl radical, an amino-substituted alkyl radical or an arylenethiazylthio-amino-subtituted alkyl radical. Thus, the new compounds are believed to be derivatives of thiohydroxylamine or sulfenamide (HSNH₂). Examples of orthoarylene radicals comprise benzo, 4-phenyl-benzo, 6-phenyl-benzo, naphtho, and homologs or the various ring substitution products of these radicals; as typical ring substituents there may be mentioned nitro, halogen, hydroxy and alkoxy groups. Examples of alkyl radicals include methyl, ethyl, propyl, butyl, amyl, hexyl, heptyl, octyl and similar radicals. Examples of amino-substituted alkyl radicals include beta-amino-ethyl, omega-amino-pentyl, omega-amino-hexyl and beta-(beta-aminoethylamino)-ethyl. An example of an arylenethiazylthioamino-substituted alkyl radical is beta-(2-benzothiazylthioamino)-ethyl, illustrated in certain of the following examples.

The following specific examples are given in further illustration of the invention.

*Example 1*

An aqueous solution was prepared containing 10 grams of mercaptobenzothiazole, 4.8 grams of sodium hydroxide and 21 grams of commercial mixed monoamylamines in a volume of 250 cc. To this solution there were added with stirring 200 cc. of a solution containing 15.3 grams of iodine and 16 grams of potassium iodide. The product was obtained as an oil, which, on being washed and dried, set to a semi-crystalline condition. The yield was practically quantitative. The product is believed to be a mixture of N-amyl-2-benzothiazyl sulfenamides of the structure

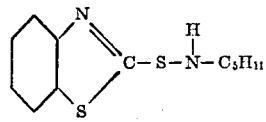

The above reaction product was tested as an accelerator by comparing it with the standard accelerator, mercaptobenzothiazole, as a control, in the following rubber formula:

| Ingredients | Parts by weight |
| --- | --- |
| Rubber (smoked sheets) | 100.00 |
| Sulfur | 3.00 |
| Zinc oxide | 5.00 |
| Stearic acid | 1.10 |
| Accelerator | 0.75 |

The two rubber compositions, so formulated, were vulcanized at 280° F. for 20 minutes. Test pieces of the vulcanized stocks were subjected to physical testing, the results of which are as follows:

| Accelerator | Modulus of elasticity in lbs./in.² at elongation of 600% | Tensile strength in lbs./in.² at break |
| --- | --- | --- |
| Mercaptobenzothiazole | 700 | 2,425 |
| N-amyl-2-benzothiazyl sulfenamides | 1,550 | 3,600 |

The foregoing data clearly show that the mixed N-amyl-2-benzothiazyl sulfenamides constitute a very effective rubber accelerator, imparting high modulus and tensile characteristics to a rubber composition in a very short curing time.

*Example 2*

A solution was prepared containing 10 grams of mercaptobenzothiazole, 2.4 grams of sodium hydroxide and excess concentrated ammonia in a volume of 100 cc. To this solution there was added with stirring a 10 per cent solution of sodium hypochlorite until the reaction mixture was depleted of mercaptobenzothiazole, as shown by a lack of precipitation of the same on acidifying a filtered sample of the reaction mixture. The product was obtained in high yield as a white precipitate, which, after being washed with water and dried, melted at 125° C. The compound is believed to be 2-benzothiazyl sulfenamide of the structure

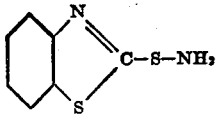

The above reaction product was tested as an accelerator by comparing it with mercaptobenzothiazole in the rubber formula set out in Example 1, the curing time being 20 minutes at 280° F. The physical testing results are as follows:

| Accelerator | Modulus of elasticity in lbs./in.² at elongation of 600% | Tensile strength in lbs./in.² at break |
| --- | --- | --- |
| Mercaptobenzothiazole | 700 | 2,425 |
| 2-benzothiazyl sulfenamide | 1,450 | 3,700 |

The above data show that 2-benzothiazyl sulfenamide is an efficient rubber accelerator, imparting high modulus and tensile characteristics to a rubber composition in a short cure.

*Example 3*

An aqueous solution was prepared containing 10 grams of mercaptobenzothiazole, 4.8 grams of sodium hydroxide and 17.5 grams of commercial mixed monobutylamines in a volume of 250 cc. To this solution there were added with stirring 200 cc. of an aqueous potassium iodide solution containing 15.3 grams of free iodine. The product, an amber-colored oil, settled to the bottom. The oil was filtered (in ether solution) and then dried in a vacuum. The oil partially crystallized to a thick paste. The yield was 13.6 grams or 95 per cent of the theoretical. The product is believed to be a mixture of N-butyl-2-benzothiazyl sulfenamides of the structure.

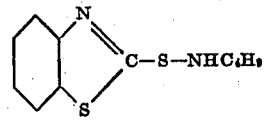

The above reaction product was tested as an accelerator by comparing it with mercaptobenzothiazole in the rubber formula set out in Example 1, the curing time being 20 minutes at 280° F. The physical testing results follow:

| Accelerator | Modulus of elasticity in lbs./in.² at elongation of 600% | Tensile strength in lbs./in.² at break |
| --- | --- | --- |
| Mercaptobenzothiazole | 700 | 2,425 |
| N-butyl-2-benzothiazyl sulfenamides | 2,150 | 3,450 |

These testing data demonstrate the high accelerating characteristics of the mixed N-butyl-2-benzothiazyl sulfenamides.

*Example 4*

When the chemical preparation procedure described in the foregoing examples was applied to mixtures of mercaptobenzothiazole, separately, with methylamine, ethylamine and n-propylamine, the following sulfenamides were obtained:

| Sulfenamide | Physical condition |
| --- | --- |
| N-methyl-2-benzothiazyl | Amber liquid. |
| N-ethyl-2-benzothiazyl | White solid, M. P. 55-57° C. |
| N-n-propyl-2-benzothiazyl | White solid, M. P. 32-33° C. |

These new compounds were tested as rubber accelerators in the rubber formula set out in Example 1, the control accelerators being mercaptobenzothiazole, and a standard accelerator of the delayed action type, dibenzothiazyl disulfide. Samples of the rubber compositions, so formulated, were heated for 30 minutes at 240° F. to determine whether or not they possessed any tendency to pre-vulcanize or set-up during processing steps prior to the usual vulcanizing step, and the following physical testing data were obtained:

| Accelerator | Modulus of elasticity in lbs./in.² at elongation of 600% | Tensile strength in lbs./in.² at break |
| --- | --- | --- |
| Mercaptobenzothiazole | 375 | 2,175. |
| Dibenzothiazyl disulfide | No cure | No cure. |
| N-methyl-2-benzothiazyl sulfenamide | do | Do. |
| N-ethyl-2-benzothiazyl sulfenamide | do | Do. |
| N-n-propyl-2-benzothiazyl sulfenamide | do | Do. |

Other samples of the aforesaid rubber compositions were heated for 20 minutes at 280° F. to determine the relative accelerating properties of the respective accelerators, and the following physical testing data were obtained:

| Accelerator | Modulus of elasticity in lbs./in.² at elongation of 600% | Tensile strength in lbs./in.² at break |
|---|---|---|
| Mercaptobenzothiazole | 800 | 2,825 |
| Dibenzothiazyl disulfide | 600 | 2,550 |
| N-methyl-2-benzothiazyl sulfenamide | 2,050 | 3,725 |
| N-ethyl-2-benzothiazyl sulfenamide | 2,625 | 3,825 |
| N-n-propyl-2-benzothiazyl sulfenamide | 2,475 | 3,625 |

The two sets of testing data given above show that the three new sulfenamide derivatives are excellent delayed-action accelerators, since rubber compositions including them did not vulcanize at the relatively low temperature of 240° F., in contrast with the composition including the standard accelerator, mercaptobenzothiazole; and the three new accelerators imparted very high physical properties to the rubber composition after a short cure at 280° F., in comparison with mercaptobenzothiazole and the standard delayed-action accelerator, dibenzothiazyl disulfide.

*Example 5*

The chemical procedure of Example 3 was applied to n-butylamine and mercaptobenzothiazole to produce N-n-butyl-2-benzothiazyl sulfenamide, a white solid melting at 35-37° C. This substance was tested in the rubber formula set out in Example 1, in comparison with the control accelerators, mercaptobenzothiazole and dibenzothiazyl disulfide. When samples of the three test compositions were heated for 30 minutes at 240° F., the composition containing the sulfenamide derivative and the composition containing dibenzothiazyl disulfide were not set-up or vulcanized, but the composition containing mercaptobenzothiazole was vulcanized, to the extent shown in Example 4. Other samples of the three test compositions were heated for 40 minutes at 280° F., and the following physical data were obtained:

| Accelerator | Modulus of elasticity in lbs./in.² at elongation of 600% | Tensile strength in lbs./in.² at break |
|---|---|---|
| Mercaptobenzothiazole | 825 | 2,750 |
| Dibenzothiazyl disulfide | 850 | 2,800 |
| N-n-butyl-2-benzothiazyl sulfenamide | 2,900 | 3,550 |

The above data clearly indicate that the n-butyl derivative is a highly effective delayed action accelerator.

*Example 6*

To 100 cc. of a stirred solution containing 10 grams of mercaptobenzothiazole, 2.4 grams of sodium hydroxide and 30 grams of ethylene diamine there was slowly added, with stirring, a 5 per cent solution of sodium hypochlorite. The reaction product precipitated as white crystals melting at 115° C., and is believed to be a mixture of N-beta-amino-ethyl-2-benzothiazyl sulfenamide of the formula

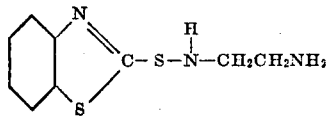

and N-beta-(2-benzothiazylthioamino)-ethyl-2-benzothiazyl sulfenamide of the formula

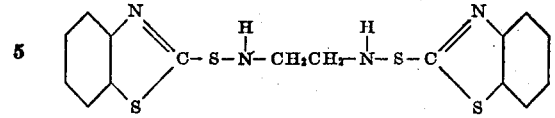

The above reaction product, as well as similar reaction products of mercaptoarylenethiazoles and propylene diamine, pentamethylene diamine, hexamethylene diamine, or diethylene triamine, are effective rubber vulcanization accelerators, comparable with the foregoing reaction products derived from unsubstituted alkyl primary amines.

*Example 7*

A solution was prepared containing 16.7 grams of mercaptobenzothiazole, 4.0 grams of sodium hydroxide and 28 grams of ethylene diamine. To this solution there were slowly added, with stirring, 150 cc. of 5.25 per cent sodium hypochlorite solution. A white, finely divided precipitate was produced, and this precipitate was then recrystalized from alcohol. Six grams of the purified product was thereby obtained, melting at 125-126° C. This purified product is believed to be substantially N-beta-(2-benzothiazylthioamino)-ethyl-2-benzothiazyl sulfenamide.

The purified reaction product was tested as an accelerator, according to the procedure of Example 1, the test rubber compositions being heated at 280° C. for 20 minutes. The following data were obtained.

| Accelerator | Modulus of elasticity in lbs./in.² at elongation of 600% | Tensile strength in lbs./in.² at break |
|---|---|---|
| Mercaptobenzothiazole | 700 | 2,425 |
| Above reaction product | 2,200 | 2,975 |

The above data show that the reaction product of mercaptobenzothiazole and ethylenediamine is a superior rubber accelerator.

Members of the preferred class of accelerators may be prepared in any suitable manner, the methods described above being given for illustration only. The accelerators are equally effective in rubber tread compounds, latex compounds or other conventional vulcanizable compounds of rubber or synthetic rubber. The various vulcanizable synthetic rubbers are herein considered equivalent to rubber, examples being the Buna types (polymers essentially derived from butadiene), such as Buna N (copolymer of butadiene and acrylonitrile) and Buna S (copolymer of butadiene and styrene). Although sulfur has hereinabove been mentioned as the vulcanizing agent preferred in practicing the invention, other conventional vulcanizing agents susceptible to acceleration are contemplated.

The preferred compounds are seen to be very rapid accelerators at conventional vulcanizing temperatures, but are of the delayed action type, in that vulcanizable compositions including them do not set-up or pre-vulcanize under conventional rubber processing conditions. The vulcanized products have been found to be highly efficient, having low hysteresis characteristics, and to be unusually resistant to deterioration on flexing or aging.

Conventional accelerator activators may be employed to an advantage with the new class of accelerators when extremely rapid vulcanization is desired especially at lower temperatures. Also, the new accelerators may be used in combination with other accelerators, such as a guanidine (e. g., diphenyl guanidine) or a conventional mercaptothiazole derivative (e. g., mercaptobenzothiazole or dibenzothiazyl disulfide), in order to produce rubber compositions having especially rapid or specific vulcanizing properties.

What is claimed is:

1. The method of vulcanizing rubber which comprises heating rubber and sulfur in the presence of an N-amyl-2-benzothiazyl sulfenamide having the formula

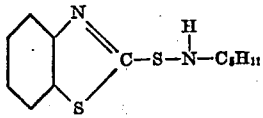

2. The method of vulcanizing rubber which comprises heating rubber and sulfur in the presence of 2-benzothiazyl sulfenamide.

3. The method of vulcanizing rubber which comprises heating rubber and sulfur in the presence of an N-butyl-2-benzothiazyl sulfenamide having the formula

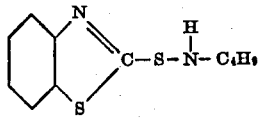

4. The method of vulcanizing rubber which comprises heating rubber and a vulcanizing agent in the presence of a substance having the formula

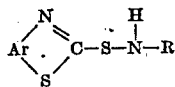

wherein Ar is an orthoarylene radical and R is one of the group consisting of hydrogen, acyclic alkyl radicals, amino-substituted alkyl radicals and arylenethiazylthioamino-substituted alkyl radicals.

5. A vulcanizable rubber composition comprising sulfur and an N-amyl-2-benzothiazyl sulfenamide having the formula

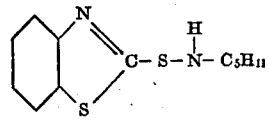

6. A vulcanizable rubber composition comprising sulfur and 2-benzothiazyl sulfenamide.

7. A vulcanizable rubber composition comprising sulfur and an N-butyl-2-benzothiazyl sulfenamide having the formula

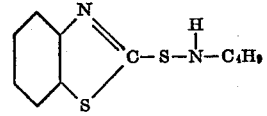

8. A vulcanizable rubber composition comprising a vulcanizing agent and a substance having the formula

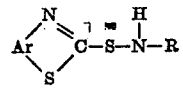

wherein Ar is an orthoarylene radical and R is one of the group consisting of hydrogen, acyclic alkyl radicals, amino-substituted alkyl radicals and arylenethiazylthio-amino-substituted alkyl radicals.

9. A vulcanized rubber product prepared by heating rubber and sulfur in the presence of an N-amyl-2-benzothiazyl sulfenamide having the formula

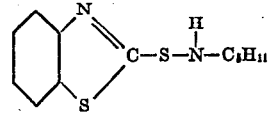

10. A vulcanized rubber product prepared by heating rubber and sulfur in the presence of 2-benzothiazyl sulfenamide.

11. A vulcanized rubber product prepared by heating rubber and sulfur in the presence of an N-butyl-2-benzothiazyl sulfenamide having the formula

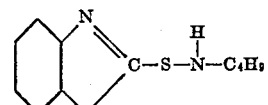

12. A vulcanized rubber product prepared by heating rubber and a vulcanizing agent in the presence of a substance having the formula

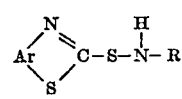

wherein Ar is an orthoarylene radical and R is one of the group consisting of hydrogen, acyclic alkyl radicals, amino-substituted alkyl radicals and arylenethiazylthioamino-substituted alkyl radicals.

13. A process of accelerating the vulcanization of rubber which comprises vulcanizing it in the presence of an arylenethiazyl sulfamine having the general formula

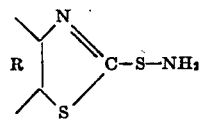

where R is an arylene group.

14. A process of accelerating the vulcanization of rubber which comprises vulcanizing it in the presence of benzothiazyl sulfamine.

15. A rubber product which has been vulcanized in the presence of an arylenethiazyl sulfamine having the general formula

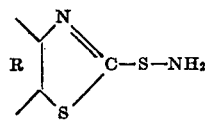

Where R is an arylene group.

EDWARD L. CARR.